United States Patent

Hegyi

[11] Patent Number: 6,118,383
[45] Date of Patent: *Sep. 12, 2000

[54] MULTI-FUNCTION LIGHT SENSOR FOR VEHICLE

[76] Inventor: Dennis J. Hegyi, 1708 Morton Ave., Ann Arbor, Mich. 48104

[*] Notice: This patent is subject to a terminal disclaimer.

[21] Appl. No.: 08/856,138

[22] Filed: May 14, 1997

Related U.S. Application Data

[63] Continuation-in-part of application No. 08/599,272, Feb. 8, 1996, Pat. No. 5,703,568, which is a continuation of application No. 08/059,597, May 7, 1993, abandoned.

[51] Int. Cl.$^7$ .................................................. G08B 21/00

[52] U.S. Cl. ........................... 340/602; 340/604; 250/573; 250/574; 15/DIG. 15; 318/483; 318/DIG. 2

[58] Field of Search ................................. 340/602, 604; 250/573, 574; 15/DIG. 25, 250.001, 25.12; 318/483, DIG. 2

[56] References Cited

U.S. PATENT DOCUMENTS

| | | | |
|---|---|---|---|
| 4,131,834 | 12/1978 | Blaszkowski | 318/483 |
| 4,290,043 | 9/1981 | Kaplan | 340/984 |
| 4,355,271 | 10/1982 | Noack | 318/480 |
| 4,481,450 | 11/1984 | Watanabe et al. | 318/444 |
| 4,485,452 | 11/1984 | Boegh-Peterson | 318/444 |
| 4,620,141 | 10/1986 | McCumber et al. | 318/483 |
| 4,798,956 | 1/1989 | Hochstein | 250/341 |
| 4,859,867 | 8/1989 | Larson et al. | 307/10.1 |
| 4,867,561 | 9/1989 | Fujii et al. | 356/237 |
| 4,871,917 | 10/1989 | O'Farrel et al. | 250/341 |
| 4,916,373 | 4/1990 | Al-Attar et al. | 318/443 |
| 4,931,767 | 6/1990 | Albrecht et al. | 340/425.5 |
| 4,956,591 | 9/1990 | Schierbeek et al. | 318/483 |
| 4,973,844 | 11/1990 | O'Farrell et al. | 250/341 |
| 4,987,354 | 1/1991 | Steinmann | 318/444 |
| 5,059,877 | 10/1991 | Teder | 318/444 |
| 5,105,129 | 4/1992 | Shimuzu et al. | 318/266 |
| 5,119,002 | 6/1992 | Kato et al. | 318/444 |
| 5,140,233 | 8/1992 | Wallrafen | 318/264 |
| 5,140,234 | 8/1992 | Wallrafen | 318/264 |
| 5,386,111 | 1/1995 | Zimmerman | 250/227.25 |
| 5,530,433 | 6/1996 | Morita | 340/630 |
| 5,703,568 | 12/1997 | Hegyi | 340/602 |
| 5,726,547 | 3/1998 | Reime | 318/483 |

FOREIGN PATENT DOCUMENTS

| | | |
|---|---|---|
| 41 39 515 A1 | 11/1990 | Germany. |
| 93 09 837 U | 10/1993 | Germany. |
| 62-043543 | 2/1987 | Japan. |
| WO 95/24635 | 9/1995 | WIPO. |
| WO 95/27894 | 10/1995 | WIPO. |

*Primary Examiner*—Julie Lieu
*Attorney, Agent, or Firm*—Rohm & Monsanto, P.L.C.

[57] ABSTRACT

A system for detecting the presence of rain droplets on a windshield employs a source of radiant energy, such as an LED, and a photodetector installed on the instrument panel of a vehicle. The LED and the photodiode are arranged with respect to one another such that light from the LED cannot reflect directly off the windshield onto the photodiode. Only when the light from the LED is back scattered by an environmental condition, such as the raindrops on the exterior of the windshield, the condensation of moisture on the interior of the windshield, or the presence of smoke in the cabin, will the photodiode receive the light from the LED. Each of these environmental conditions has a predeterminable characteristic signature that permits the processing of data to detect same. An ambient light signal is subtracted from the combination of the rain and ambient light signals by pulsed operation of the LED and subtracting the ambient light signal, which is detected when the LED is dark, from the combined LED and ambient light signal which is present when the LED is illuminated. A further LED is provided to effect a fog detection system that detects condensation on the interior of the vehicle windshield. The further LED illuminates the photodiode in a manner whereby the light on the photodiode is reduced when condensation is present. Also, a monitoring arrangement that employs a separate light sensor provides compensation for variances resulting from component aging and thermal influences.

32 Claims, 5 Drawing Sheets

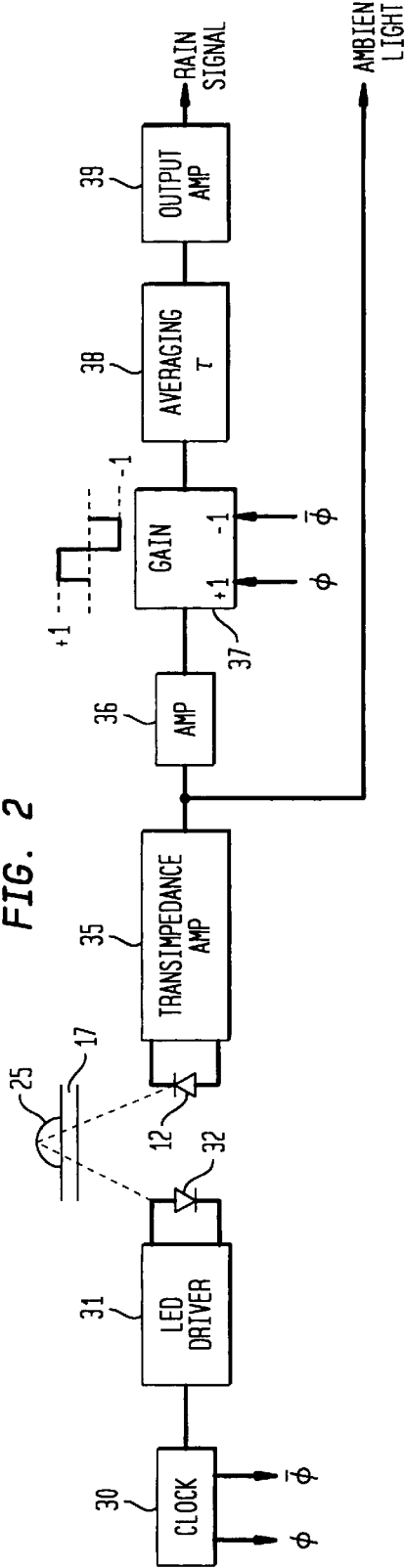
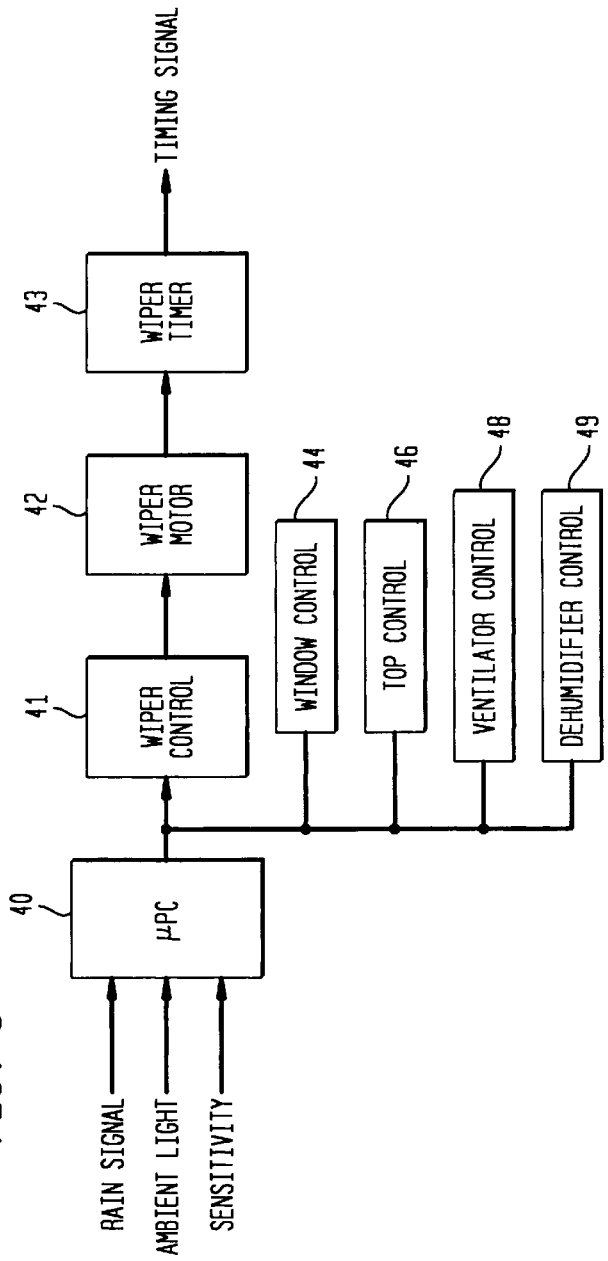

MULTI-FUNCTION LIGHT SENSOR FOR VEHICLE

RELATIONSHIP TO OTHER APPLICATIONS

This application is a continuation-in-part of U.S. Ser. No. 08/599,272, filed Feb. 8, 1996, now U.S. Pat. No. 5,703,568 which is a continuation of U.S. Ser. No. 08/059,597, filed May 7, 1993, now abandoned, the disclosures of which are incorporated herein by reference.

BACKGROUND OF THE INVENTION

1. Field of the Invention

This invention relates generally to systems and arrangements for determining the presence of a plurality of environmental conditions in relation to a vehicle, and more particularly, to a system that can control the operation of a device, such as the windows, the convertible roof, the air conditioner, a dehumidifier, the ventilation system, or the windshield wipers of a vehicle, in response to the presence of droplets of liquid on a transparent surface thereof, such as the windshield of the vehicle, the presence of condensation on the interior of the windshield of the vehicle, or the presence of smoke in the vehicle.

2. Description of the Related Art

Numerous efforts have been made in the prior art to provide a system that reliably will control the windshield wipers of a vehicle in response to the presence of water on the windshield. In addition to falling to meet the level of reliability required to avoid the annoying and distracting false triggering of windshield wipers, the majority of the known arrangements must be installed directly onto the windshield, resulting in unsightly wiring extending from a sensor that has been bonded to the interior of the windshield. With respect to the false triggering of the windshield wipers, many of the known arrangements will trigger a false indication of rain in response to fluctuations in the ambient light, as would be the case with a vehicle traveling under the shadows of telephone poles, or under highway lamps.

Existing optical rain sensors of the type that are usually installed within vehicles are mounted on the windshield in the wiper path. Optical sensors generally include a light source, such as an LED, and a photodetector, usually a phototransistor or a photodiode, arranged such that when no raindrops are on the windshield, light from the LED is totally internally reflected at the outside surface of the windshield to a photodiode. If a drop of rain is deposited on the windshield where the light beam is reflected, the conditions for total internal reflection are violated, and the intensity of light in the reflected beam is reduced. In these known systems, a relatively large array of LEDs and photodiodes are required to monitor a few square inches on the windshield. The extent of the monitored region of the windshield must be sufficiently large to provide an accurate sample of the random distribution of raindrops that fall on the surface of the windshield. As stated, the array of LEDs and photodiodes must be mounted inside the vehicle on the windshield in the wiper path.

Another problem associated with known arrangements is that of cost. In most of the presently available designs, one photodetector is required for each LED in the array. There is, therefore, a need for a rain sensor that is economical and which need not be installed on the windshield of the vehicle.

In addition to water depositing on the outer surface of the windshield, water will collect on the interior of the windshield in the form of condensed water vapor, sometimes called "fog." Such condensed water vapor can, within a matter of minutes, reduce the visibility through the window to a dangerous level. In such situations, it is essential that the defogger function be carried out by cycling the air conditioner to dehumidify the air. The operation of the air conditioner generally will decrease the amount of fog on the interior of the windshield in a relatively short period of time.

It is additionally useful in a vehicle to reduce the accumulation of smoke in the cabin of the vehicle which would result from the smoking of tobacco by the occupants. On occasion, the operator of the vehicle would be reluctant to embarrass a smoking passenger by obvious manipulation of the ventilator controls. Accordingly, it would be desirable for the ventilator to be operated automatically in response to the presence of smoke in the cabin.

A significant further problem with known arrangements that employ commercially available light-emitting devices is that as the devices age, or as they are subjected to increased temperature, their light output diminishes. Thus, over time, the amplitude of the light output will drift, causing false readings. There is a need, therefore, for an arrangement that will reliably detect the presence of water droplets on a vehicle windshield, as well as other environmental conditions, while maintaining immunity from the effects of age and temperature.

It is, therefore, an object of this invention to provide an arrangement that is simple and will reliably detect the presence of water droplets on the outside of a windshield of a vehicle.

It is another object of this invention to provide an arrangement that is simple and will reliably detect the presence of condensed water vapor on the inside of a windshield of a vehicle.

It is also an object of this invention to provide an arrangement that is simple and will reliably detect the presence of smoke in the cabin of a vehicle.

It is a further object of this invention to provide a system for automatically operating the windshield wipers of a vehicle in response to the presence of water on the windshield.

It is additionally an object of this invention to provide a system for automatically operating an air conditioning or dehumidification system of a vehicle in response to the presence of condensed water vapor on the windshield.

It is yet a further object of this invention to provide a system for automatically operating the cabin ventilation system of a vehicle in response to the presence of smoke, such as cigarette smoke, in the cabin of the vehicle.

It is also another object of this invention to provide a system that responds to the effect on light by several environmental conditions, while maintaining immunity to variations in the ambient light levels.

It is yet an additional object of this invention to provide a system that responds to the effect on light by several environmental conditions, while maintaining immunity to the effects of age and temperature on light-emitting components.

It is still another object of this invention to provide a system that responds redundantly to the effect on light by several environmental conditions to ensure reliable operation and reduce false operations.

It is a yet further object of this invention to provide a windshield wiper control sensor that need not be installed directly on the windshield of the vehicle.

A still further object of this invention is to provide a system that responds to the effect on light by several environmental conditions, in the vicinity of the windshield of the vehicle, without the need for establishing a direct contact between the system and the windshield.

An additional object of this invention is to provide a windshield wiper control sensor that can be installed on the instrument panel of the vehicle.

SUMMARY OF THE INVENTION

The foregoing and other objects are achieved by this invention which provides apparatus and method for controlling the operation of the windshield wipers of a vehicle in response to the deposition of water on the exterior of the windshield; the operation of the air conditioning system in response to the formation of water condensation on the interior of the windshield of the vehicle; and the operation of the ventilator system in response to the presence of smoke in the cabin of the vehicle.

In accordance with a first aspect of the invention, an arrangement is provided for detecting the presence of water droplets on a windshield of a vehicle. An energy source produces a radiant energy having a first portion that is directed toward the windshield and a second portion, which corresponds to a portion of the first portion, being reflected in a direction away from the windshield. The energy source is of a type that has a time-varying characteristic whereby a predetermined characteristic of the radiant energy varies over time. By way of example, the time-varying characteristic may be the result of aging of the source or the heating thereof Such aging and heating could result in a predetermined characteristic of the radiant energy, such as amplitude or color, varying over time. There is additionally provided a first sensor having a first sensor input for receiving the second portion of the radiant energy. The first sensor is provided with a sensor output that produces a first sensor output signal which is responsive to the radiant energy that is received at the first sensor input. A second sensor having a corresponding second sensor input receives a third portion of the radiant energy produced by the energy source. The second sensor has a sensor input that produces a second sensor output electrical signal that is responsive to the third portion of the radiant energy received at the second sensor input. As will be described herein, the output of the second sensor produces an electrical signal having an information content that is used to correct, or compensate for, deviations in the predetermined characteristic of the radiant energy over time, effectively resulting from aging or heating of the source. There is additionally provided a processor that receives the information responsive to the first and second sensor output electrical signals, and is provided with an output for producing a controlled signal. The controlled signal is responsive to a first information component in the first sensor output signal, which is responsive to the presence of water droplets on the windshield. A second information component in the first sensor output electrical signal is responsive to the time-varying characteristic of the source. A third information component is derived from the second sensor output electrical signal and, as described herein, can be used to overcome the effects of aging or heating of the source.

In a preferred embodiment, the third portion of the radiant energy produced by the energy source has a magnitude that is in fixed relationship to the radiant energy produced by the source. That is, if it is desired to compensate for variation in the intensity of the radiant energy being produced by the energy source, then the third portion of the radiant energy should have an intensity that is fixed in proportion to the radiant energy being produced by the energy source.

It is to be understood that the present invention is not limited to the monitoring of time-varying intensity of the radiant energy, as other parameters and characteristics may be monitored and compensated in accordance with the principles of the invention. In addition, the monitoring and compensating effected herein with the second sensor is not limited to long-term variation resulting from aging, but shorter term effects such as may result from thermal variations or supply voltage variations can also be corrected. The compensation effected herein also will render more effective and precise the establishment of a sensitivity level via a sensitivity control signal responsive to a predetermined quantum of water droplets on the windshield of the vehicle.

Further in accordance with the invention, the vehicle is of the type provided with a windshield wiper, and there is additionally provided a windshield wiper control arrangement that operates the windshield wiper in response to the control signal. Such control may be effected via a windshield wiper timer that produces a signal responsive to the duration of a wipe cycle of the windshield wiper. The windshield wiper timer is employed to produce a signal that is responsive to the duration of a wipe cycle of the windshield wiper. This is useful to determine whether the windshield is wet or dry, since a wipe cycle generally will take longer on a dry windshield. Thus, the amount of water on a windshield can be established and confirmed by the two mechanisms, i.e., scattering of the radiant energy by the droplets, and reduced duration of the windshield wiper wipe cycle.

The control signal at the output of the processor is not limited to operation of the windshield wipers. In some embodiments of the invention, the control signal may be applied to operate a window, such as a power window, which would be closed in the event rain is detected. In other embodiments, the control signal may be employed to operate a convertible top, which would be closed in response to the detection of rain.

In a preferred embodiment of the invention, the cyclical enabling signal has a frequency within a range of approximately between 5 kHz and 100 kHz. The integration time constant has a value of approximately between 0.5 ms and 250 ms. In addition, a structure, which may be in the form of a light baffle with one or more apertures therethrough for controlling or otherwise defining the field of view of the light sensor, may be employed, particularly with respect to the light sensor.

In accordance with a further aspect of the invention, an arrangement is provided for producing a control signal in response to the presence of liquid droplets on a translucent material having first and second surfaces. The inventive arrangement is provided with a first source that produces a first radiant energy and directs same toward at least a portion of the first surface of the translucent material. A first portion of the first radiant energy is reflected by the translucent material, and a second portion of the first radiant energy is scattered by the water droplets on the translucent material. A second source produces a second radiant energy and directs same toward at least a portion of the first surface of the translucent material. In a manner of operation similar to that of the first source, a first portion of the second radiant energy is reflected by the translucent material and a second portion of a second radiant energy is also provided, part of which may be scattered by the water droplets on the translucent material. A cyclical driver is coupled to the first and second sources for causing same to produce the first and second radiant energies during predetermined portions of a cycle. In this manner, the first radiant energy is generated during a first portion of the cycle, and the second source is caused to produce the second radiant energy during a second portion of a cycle. A first sensor having a first sensor input for receiving an ambient light and a received portion of the second portion of the first radiant energy from the first source, is additionally provided. The first portion of the first radiant energy is excluded from the first sensor, and the second portion of the radiant energy has an amplitude that is responsive to the water droplets on the translucent material. Additionally, the first sensor receives portions of the first and second portions of the second radiant energy. A first sensor output of the first sensor produces a first sensor output electrical signal that is responsive to the light received at the first sensor input.

In one embodiment of the invention, there is provided a second sensor having a second sensor input for receiving a third portion of the first radiant energy produced by the first sensor. The second sensor has a sensor output for producing a second sensor output electrical signal that is responsive to the third portion of the first radiant energy received at the second sensor input. In a still further embodiment, the second sensor additionally receives at the second sensor input a third portion of the second radiant energy produced by the second source means. The second sensor therefore monitors the radiant energy outputs of the first and second sources, and preferably, ambient light is excluded therefrom.

The first sensor delivers its output signal to a phase-sensitive detector. Alternatively, a differential sample-and-hold arrangement can be employed in the operation of the invention, particularly at the output of the second sensor. In one embodiment, the phase-responsive device produces a time-varying signal that is responsive to a difference between the magnitude of the sensor output electrical signal when the cyclical enabling signal is in the first state, and the magnitude of the sensor output electrical signal when the cyclical enabling signal is in the second state. In one embodiment, first and second amplifier stages are provided, each having a predeterminable gain characteristic. The first and second amplifier stages are AC-coupled to one another.

There is additionally provided in some embodiments an integrator coupled to the phase-responsive device for integrating the time-varying signal over time to produce a rain signal. The integrator has an integration time constant characteristic that is longer than a cycle of the cyclically enabling signal. The processor has a plurality of inputs for receiving the rain signal and the second electrical signal that is substantially responsive to the ambient light. A control signal is produced at the output of the processor. The responsiveness of the overall device to the quantum of water droplets on the windshield is adjustable with a sensitivity control that is coupled to the processor. The control signal is used to operate the windshield wiper.

In accordance with a first method aspect of the invention, there is provided a method of producing a signal responsive to droplets of liquid on a surface of a translucent material having first and second surfaces. The method is provided with the steps of:
  first illuminating the first surface of the translucent material with a first cyclically varying light which is in an illuminated state for a first portion of a cycle and dark for a second portion of the cycle, the first cyclically varying light having a first portion directed along a first reflection path to a light sensor, and a second portion that is not directed along the first reflection path;
  second illuminating the first surface of the translucent material with a second cyclically varying light which is in an illuminated state for the second portion of the cycle and dark for the first portion of the cycle, the second cyclically varying light having a first portion directed along a second reflection path to a light sensor, and a second portion that is not directed away from the second reflection path;
  first excluding from impinging on a light sensor the first portion of the first cyclically varying light;
  receiving at the light sensor a portion of the second portion of the first cyclically varying light that is scattered by the droplets of the liquid on the translucent material;
  receiving at the light sensor an ambient light;
  receiving at the light sensor a reflected portion of the first portion of the second cyclically varying light; and
  producing at an electrical output of the light sensor a sensor signal corresponding to the light received by the light sensor.

In accordance with a further method aspect of the invention, there are provided the steps of:
  first illuminating the first surface of the translucent material with a first cyclically varying light which is in an illuminated state for a first portion of a cycle and dark for a second portion of the cycle, the first cyclically varying light having first and second light portions, the first light portion being directed along a first reflection path configured to avoid impinging upon a first light sensor;
  receiving at the first light sensor a portion of the first light portion of the first cyclically varying light that is scattered by the droplets of the liquid on the translucent material;
  receiving at the light sensor an ambient light;
  producing at an electrical output of the first light sensor a first sensor signal corresponding to the light received by the first light sensor;
  receiving at a second light sensor a portion of the second light portion of the first cyclically varying light;
  producing at an electrical output of the second light sensor a second sensor signal corresponding to the light received by the second light sensor; and
  correcting a first information content in the first sensor signal with a second information content in the second sensor signal.

In one embodiment of this further method aspect of the invention, the step of second illuminating the first surface of the translucent material with a second cyclically varying light which is in an illuminated state for the second portion of a cycle and dark for the first portion of the cycle, a first light portion of the second cyclically varying light being directed along a second reflection path configured to impinge upon the first light sensor.

In a specific illustrative embodiment of the invention, there are provided the additional steps of:
  receiving at the first light sensor a reflected portion of the first portion of the second cyclically varying light; and
  receiving at the second light sensor a portion of the second cyclically varying light.

In a further embodiment, there is provided the step of controlling the operation of a selectable one of a wiper system and a blower system in response to the first sensor signal. That is, the present invention can be coupled to operate corrective systems of a vehicle, such as the wiper system, the ventilator, and/or the dehumidifier.

In accordance with a still further method aspect of the invention, there is provided a method of producing a plurality of signals, each responsive to a predetermined environmental condition of the vehicle, the vehicle being of the type having a windshield having interior and exterior surfaces. The method includes the steps of:

energizing a first source of illumination whereby a first electromagnetic energy is directed toward the interior surface of the windshield, the first electromagnetic energy being in the form of a cyclically varying light that is emitted while the first source of illumination is in an illuminated state for a first portion of a cycle, the first electromagnetic energy not being emitted while the source of illumination is dark during a second portion of the cycle;

energizing a second source of illumination whereby a second electromagnetic energy is directed toward the interior surface of the windshield, the second electromagnetic energy being in the form of a cyclically varying light that is emitted while the second source of illumination is in an illuminated state for the second portion of a cycle, the second electromagnetic energy not being emitted while the source of illumination is dark during the first portion of the cycle;

receiving at a light sensor an ambient light, a portion of the first cyclically varying light that has been scattered in response to the environmental condition at the interior surface or exterior surface of the windshield, a portion of the second cyclically varying light that has been reflected by the windshield, and a portion of the second cyclically varying light that has been scattered in response to the environmental condition at the interior surface or exterior surface of the windshield;

producing at an electrical output of the light sensor a sensor signal corresponding to the light received by the light sensor; and producing a control signal.

In one embodiment of this further method aspect of the invention, wherein the environmental condition is water droplets deposited on the exterior of the windshield, the first and second cyclically varying lights in the step of receiving are scattered by the water droplets. In situations where the environmental condition is water vapor condensing on the interior of the windshield, the first and second cyclically varying lights in the step of receiving are scattered by the condensed water vapor. Similarly, the environmental condition can be smoke particles in the vehicle interposed in the light path between the first source of illumination and the light sensor. The smoke particles cause the cyclically varying lights to be scattered.

It is important to recognize that any one or all of the aforementioned environmental conditions that are detected, can be detected by the same structure. The identification of the particular environmental condition that is present with respect to the vehicle is determinable by software. For example, when a car is operated in a defogger mode where the defogger function is carried out by cycling the air conditioner to dehumidify the air, it is observed that when the relative humidity inside the car is such that moisture condenses out on the windshield, the amount of fog on the windshield increases until the air conditioner cycles on after which the fog level rapidly decreases. One feature that is characteristic of the process is that the time for moisture to buildup is always longer than the time for the moisture to evaporate from the windshield. The time for moisture to buildup is rarely less than about 20 seconds, and could last several minutes, while the evaporation can occur over a time from a few seconds to perhaps over a minute.

Smoking has a characteristic signature, that is distinct, but not quite as distinct as for moisture condensing on the windshield. Smoking has a time scale of significant variations within a few seconds. Also, the time for smoke to buildup is always smaller than the time for it to dissipate.

With respect to a signal for condensing moisture and fog, as detected by a rain detector structure, as described herein, it is noted that moisture condensing out on the windshield scatters light back from the light source, which may be in the form of LEDs, which is superimposed on the rain signal and detected by the photodiode after passing through a lock-in amplifier. Also, smoke that passes between the LED and the windshield will increase the amount of back scattered radiation detected by the photodiode after passing through the lock-in amplifier, and will be superimposed on the rain signal. In such an embodiment which is subjected to all three types of environmental conditions, software can be applied to separate out the three different signals, i.e., rain, fog, and smoke, without the confusion of triggering on the windshield wipers in the presence of only fog and smoke.

In a still further embodiment of the invention, there are provided the steps of receiving at a further light sensor respective portions of the first and second sources of illumination, and producing a compensation signal at the output of the further light sensor. A compensation signal, as previously described, can be applied to effect correction for a variety of time-varying conditions, such as aging of the components, thermal effects, and the like.

BRIEF DESCRIPTION OF THE DRAWING

Comprehension of the invention is facilitated by reading the following detailed description, in conjunction with the annexed drawing, in which:

FIG. 2 is a function block representation of circuitry used in combination with the structure of FIG. 1 to produce signals corresponding to the presence of rain or fog on the windshield, or smoke, and the magnitude of the impinging ambient light;

FIG. 3 is a function block representation of a microprocessor that receives the signals generated by the structure in FIG. 2 and controls a windshield wiper control unit;

DETAILED DESCRIPTION

Figure 1:
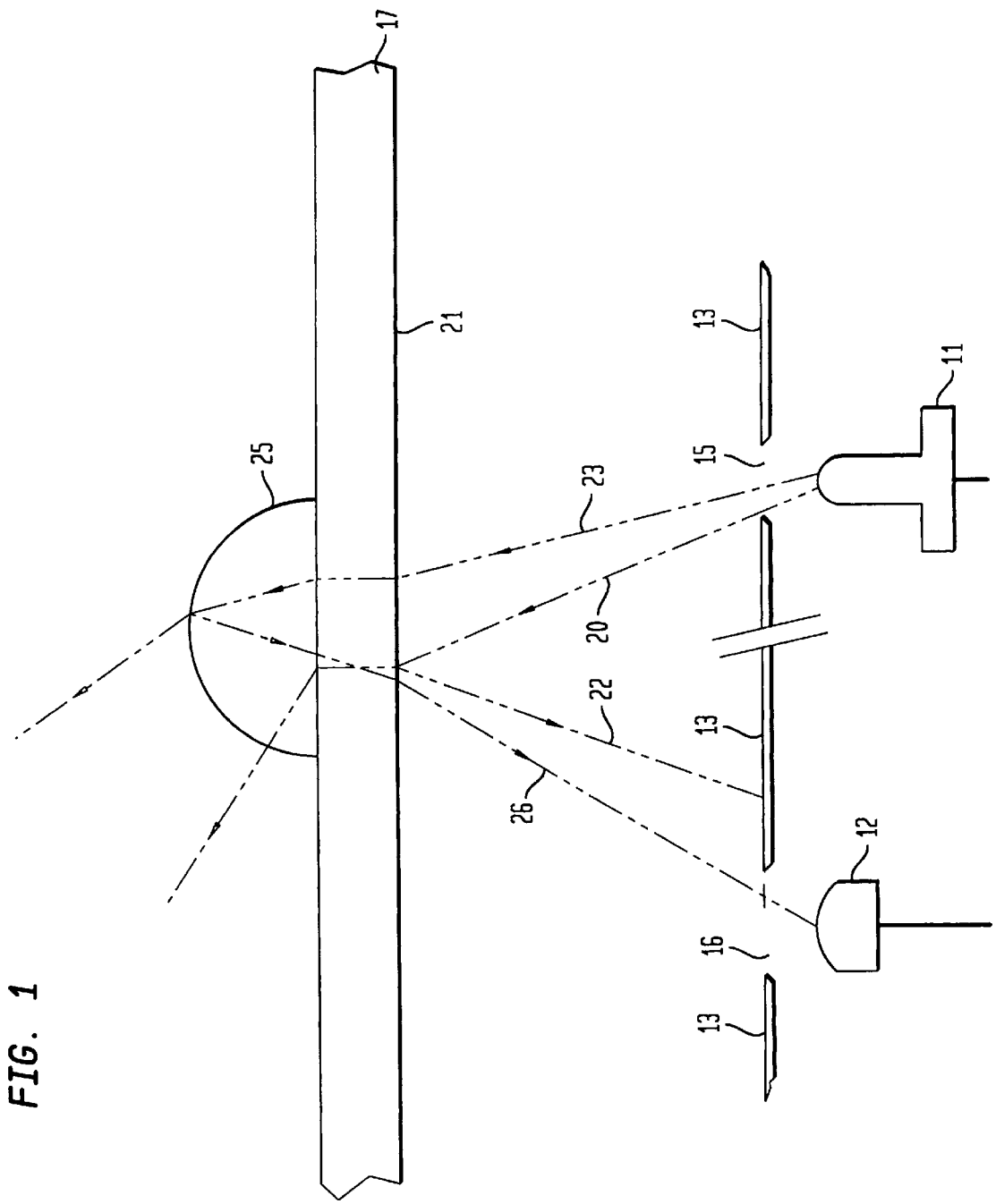
FIG. 1 is a schematic representation of certain elements of structure that are arranged in accordance with the principles of the invention.

FIG. 1 is a schematic representation of certain elements of structure configured in accordance with the principles of the invention. More specifically, a light source, in the form of LED 11 and a photodiode 12 are arranged beneath a baffle 13 having an aperture 15 therethrough for LED 11 and an aperture 16 for photodiode 12. Baffle 13 may be the top surface of the instrument panel (not shown) of a vehicle (not shown). As will be discussed hereinbelow, apertures 15 and 16 are configured to prevent light from being reflected directly to the photodiode by the windshield.

The operation of baffle 13 with apertures 15 and 16 therethrough is illustrated in FIG. 1. As shown, a light ray 20 is propagated from LED 11 and impinges upon inner surface 21 of windshield 17. The light ray is reflected back as a reflected ray 22, which is shown in the figure to impinge upon baffle 13. Some of the light from LED 11, such as light ray 23, impinges upon inner surface 21 of the windshield, where it is refracted into and through the windshield to a raindrop 25. The raindrop back scatters the light along a back scattered ray 26 which is propagated through apertures 16 and into photodiode 12. Thus, it can be seen that the light from LED 11 is directed to photodiode 12 only after being back scattered, such as by a raindrop. The intensity of light reflected at an interface is related to the ratio of the indices of refraction of the two media on opposite sides of the interface. The index of refraction of most glasses is about 1.5, while the index of refraction of water is 1.33, and the index of refraction of air is 1.00. When a raindrop is present, instead of a reflection arising at the outer surface of the windshield because without the raindrop the discontinuity in the index of refraction between the glass and air is relatively large, the light from the LED is transmitted into the raindrop and the reflection occurs at the discontinuity of the index of refraction at the curved air-water interface at the outer surface of the raindrop. This surface reflects light back into the vehicle over a large angular range, some of the rays striking the photodiode.

The photodiode signal is proportional to the fractional area of the windshield covered by raindrops which is relatively similar to the way human vision is interfered with by raindrops. The angular range over which light is reflected depends upon the cross-sectional width of the raindrop at the water-glass interface, i.e., the diameter of the part of the raindrop touching the glass, and, to the extent that its outer surface can be approximated as a sphere, by the radius of that sphere. If the width-to-radius ratio were the same for different size raindrops, they would all reflect light over the same angular range. Assuming spherical raindrops with the same width-to-radius ratio, the amount of light reflected into a given direction depends only on the cross-sectional contact area of the raindrop. Thus, the total amount of light reflected back into the photodetector is proportional to the area of the glass covered by raindrops. Also, the visual obscuration of the rain is approximately proportional to the area covered by the raindrops. From this, one can conclude that the intensity of light reflected by raindrops on a windshield back to the photodiode is a good measure of the obscuration caused by rain that a driver experiences and that the signal detected by this rain sensor is an appropriate one to gage the visual perception of rain by a driver.

The rain detector system of the present invention must work under a variety of conditions. Occasionally, the sun is shining when it is raining, and the LED light reflected by raindrops must be detectable in sunlight. This is achieved by modulating LED 11 at a reference frequency and picking out the photodiode current at the same frequency in phase with the modulated LED light using a type of phase-sensitive amplifier, sometimes referred to as a lock-in amplifier.

Referring once again to FIG. 1, light rays 20 and 23 are shown to exit LED 11. As previously described, light ray 20 is reflected from inner surface 21 of windshield 17 and is propagated through aperture 16 of the photodiode. Any ray that exits further to the left will strike aperture 15 of LED 11, and therefore, one is assured that no rays that are directly reflected by the windshield will reach photodiode 12. However, it is possible hat a ray from LED 11 will be scattered twice and reach the photodiode. With reasonable care being paid to designing the apertures, relatively little of the light will reach the photodiode by scattering or by light reflecting from objects other than raindrops. Even if some light not scattered by raindrops reaches the photodiode, it does not significantly prevent the detection of raindrops. It does, however, decrease the dynamic range of the detector. The electronics, which will be described hereinbelow, will saturate with a smaller amount of rain on the windshield because some of the dynamic range is taken up by light scattered by other objects. Also as will be described hereinbelow, some light may be scattered by the presence of condensed water vapor (not shown) on inner surface 21 of windshield 17, or the presence of smoke (not shown) in the cabin of the vehicle.

FIG. 2 is a function block representation of an electronic system constructed in accordance with the principles of the invention. The electronics described with respect to this figure will detect the tiny fraction of the LED's light that reaches the photodiode in the large ambient light background, which can include full sunlight. Referring to FIG. 2, a clock 30 drives an LED driver 31 that is coupled to an LED array 32. LED array 32 bears analogous correspondence to LED 11 in FIG. 1. As shown in FIG. 2, the light from LED array 32 is propagated through windshield 17 and scattered in raindrop 25 so as to be reflected to photodiode 12.

Clock 30 and LED driver 31 function in combination to produce a square wave output (not shown) whereby the LED array is turned on for half of the clock period. The portion of the light propagated from LED array 32 which is received at photodiode 12 is converted into a current signal that is provided at an input of a transimpedance amplifier 35. The output of transimpedance amplifier 35 is a voltage which is proportional to the photodiode current. This voltage signal is then conducted to an amplifier 36. The output of amplifier 36 is conducted to a gain stage 37 which has a controllable gain of +1 or −1, and is used to separate the signal from the background. As shown, gain stage 37 has inputs for receiving phase references from clock 30. The gain is set to +1 when the LED is on, and to −1 when the LED is off Since the ambient light is the same during the two halves of the clock period, the sum of the two halves is (rain signal+ambient light) when the gain is +1 and (−ambient) when the gain is −1. When these are added together, the result is the rain signal, i.e., (rain signal+ambient)+(−ambient)=rain signal.

An averaging stage 38 produces an average over time τ that is long compared to a clock period. The addition described hereinabove which separates the rain signal from the ambient background occurs in averaging stage 38. An output amplifier 39 provides additional gain and produces at its output the rain signal.

In order to change the sensitivity of the rain detector to correspond to night driving conditions for which the eye is more disturbed by rain on the windshield, an ambient light signal is derived from the output of transimpedance amplifier 35. During daytime operation, the ambient light generates a much larger current in the photodiode than the light back scattered by the raindrops so that the output of the transimpedance amplifier is approximately a measure of the ambient light signal. During low sky brightness conditions, the amplitude of the ambient light signal is reduced. That information is sent to a microprocessor, as will be described hereinbelow.

FIG. 3 is a function block representation of a microprocessor 40 coupled at an output thereof to a wiper control 41. Microprocessor 40 is provided with an analog-to-digital convertor (not shown) which changes the threshold level rain signal necessary to generate a wipe to be reduced. In addition, microprocessor 40 provide control signals for the ventilator and dehumidifier controls, as will be described below.

Wiper control 41 is coupled at its input to microprocessor 40, and at its output to a windshield wiper timer 43. As will be discussed below, the wetness of the windshield (not shown) may be determined by the speed of the wipe of the windshield wipers (not shown). Such speed can be determined with the aid of wiper timer 43, which produces a signal at its output which corresponds to the time duration of a wipe of the windshield wipers. Microprocessor 40 is shown to be coupled to a window control 44 and to a top control 46. As stated, the microprocessor also controls the operation of ventilator control 48 and dehumidifier control 49.

Another situation for which the threshold level necessary to generate a wipe by the wipers should be reduced is when large drops of rain strike the windshield. For a given area of the windshield covered by small or large raindrops, large drops are visually much more distracting to a driver. A mathematical expression sensitive to the fractionally larger statistical fluctuations of large drops versus small drops can be written as:

$$Q = \frac{\sum_{i=1}^{n}(m_i - m_{ave})^2}{n(m_{ave})^2} \qquad \text{(Eq. 1)}$$

Here, $m_i$ is the change in the rain signal between the $i^{th}$ time element and the (i−1) time element that occur between two successive passages of the wiper blade past the rain sensor, and $m_{ave}$ is the average value of $m_i$ over the interval between two successive wipes. The quantity Q is the square of the standard deviation of $m_i$ normalized by $(m_{ave})^2$ in order to make a dimensionless ratio. For larger raindrops that are characterized by larger fluctuations, Q is larger than for small drops and may be used to reduce the threshold level of the rain signal necessary to generate a wipe. Also, FIG. 3 shows three inputs to the microprocessor: the rain signal, the ambient light signal, and a separate input set by the driver (not shown) to adjust the threshold amount of rain that generates an output to the wiper control that initiates a wipe.

There are times when it is difficult to tell when the windshield is wiped clean of all water. For example, if the water is a thin, very smooth sheet, it will scatter little radiation to the photodetector. Another way of getting an independent measure of the dryness of a windshield is by monitoring the time between successive wipes of a windshield wiper. As the windshield gets drier, there is more friction between the wiper and the glass, and the wiper motor slows down increasing the time between wipes. Monitoring the time between successive passages of the wiper blade in front of the rain sensor, the passage of the wiper appears as a very large amplitude signal that last for a small fraction of the time between wipes. This characteristic can be used by microprocessor 40 to determine whether the windshield is dry enough to shut down the wiper.

Figure 4:
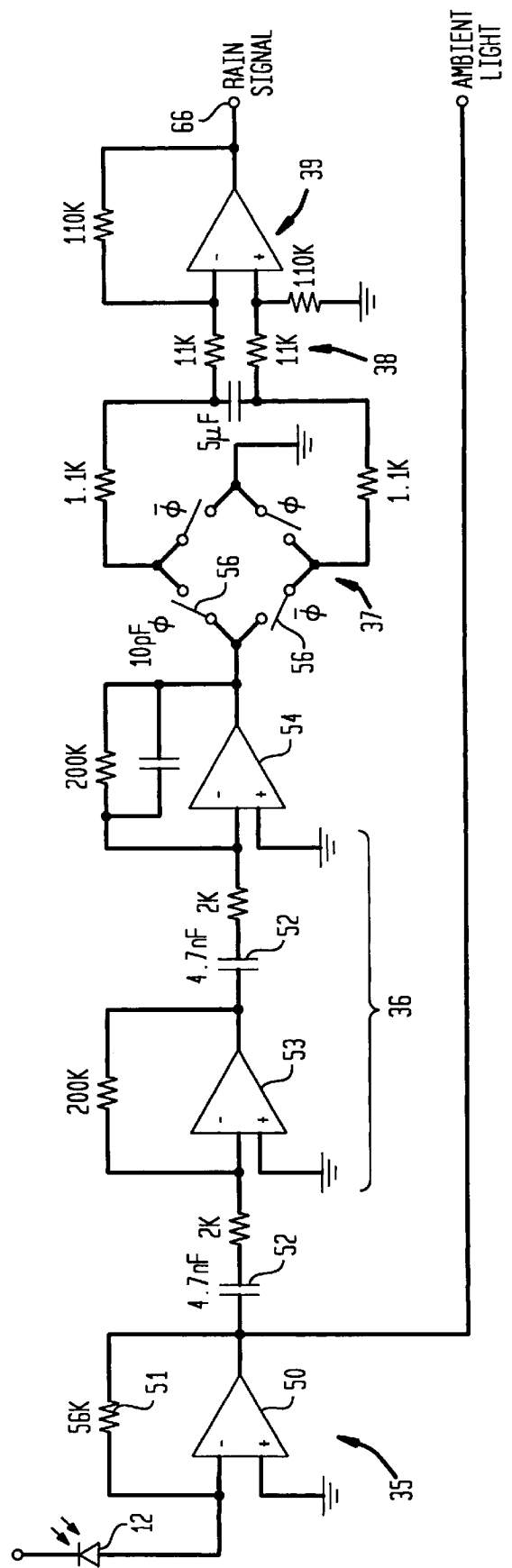
FIG. 4 is a schematic representation of a circuit that can be employed in the embodiment of FIG. 2.

FIG. 4 is a schematic representation of an electrical circuit for a phase-sensitive amplifier. As previously stated, photodiode 12 generates a current in transimpedance amplifier 35. In this specific illustrative embodiment, transimpedance amplifier 35 is formed of an amplifier 50 with a feedback resistor 51. Amplifier 50 produces at its output the ambient light signal. In this embodiment, feedback resistor 51 has a value of 56 kΩ. The transimpedance amplifier is AC-coupled via a capacitor 52 to amplifier 36 that is formed of an amplifier 53 that is AC-coupled to a further amplifier 54. Amplifier 53 has a gain of 100, as does amplifier 54.

Amplifier 36 is coupled at its output to gain stage 37 which is provided with a plurality of switches 56 that are set by the complementary outputs of clock 30, which will be described hereinbelow with respect to FIG. 5.

Figure 5:
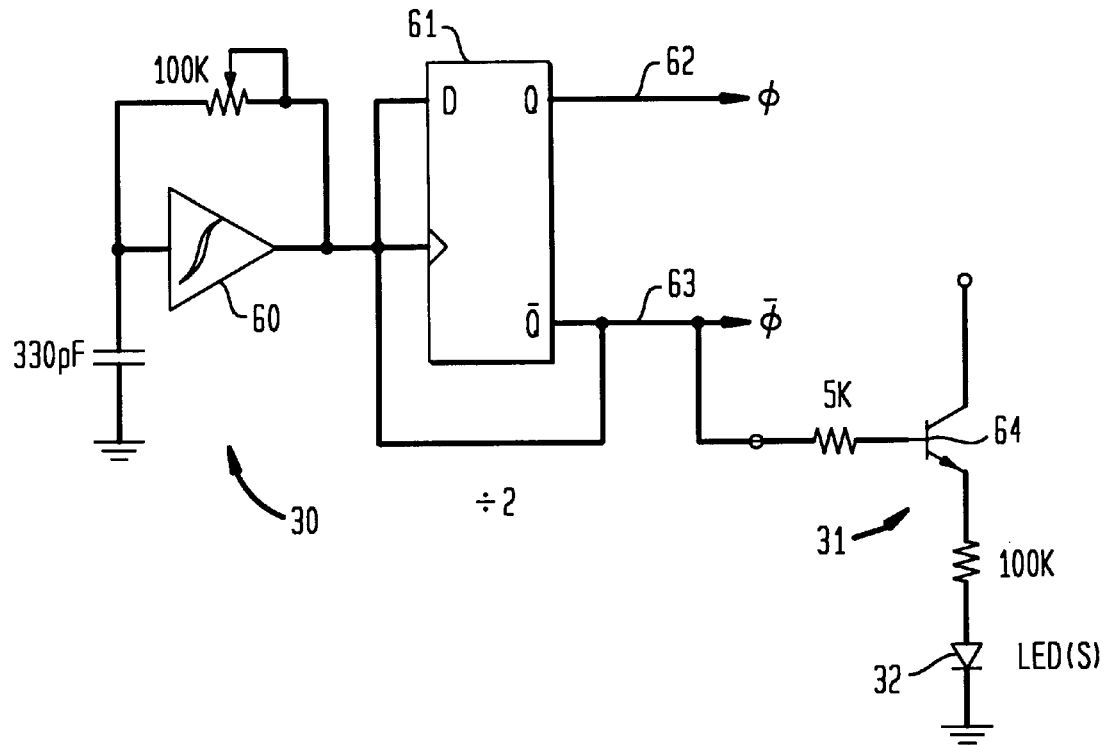
FIG. 5 is a schematic representation of circuitry that drives a light emitting diode in response to a clock.

Referring for the moment to FIG. 5, this figure is a schematic representation of clock 30 and LED driver 31. As shown, clock 30 is formed of an oscillator 60 that is coupled at its output to a type D flip-flop 61. Flip-flop 61 has complementary outputs 62 and 63, output 63 being coupled to LED driver 31, which is in the form of a transistor 64. Transistor 64 drives LED array 32, as described herein.

Referring once again to FIG. 4, switches 56 are opened and closed in response to outputs 62 and 63 of flip-flop 61 to provide the gain of +1 and −1, as described hereinabove with respect to FIG. 2. Gain stage 37 is coupled to averaging circuit 38 that is based on an RC design such that the averaging timer τ=RC. In this circuit, R consists of two 1.1 KΩ resistors in series so that R=2.2 KΩ, and C=5 μF, so that τ=11 ms. Output amplifier stage 39 provides a final gain of 10, and provides the rain signal, as well as the fog and smoke signals, at an output 66 thereof.

As previously described, the present invention is useful to determine the presence of condensed water vapor on the interior surface of the windshield, and smoke in the cabin of the vehicle. In embodiments of the invention where it is desired to determine the presence of condensation on the windshield or smoke, the present invention is operated to separate out the three signals, rain, fog, and smoke, and not get confused by the windshield wipers going back and forth.

The logic behind this process is as follows: The lowest level signal coming out of the lock-in amplifier is stored as a "clean windshield signal." Thus, the passing back and forth of the windshield wipers does not confuse the data processing when there is a rapid increase in signal (one with a rise and fall time of about 100 ms), which is easily recognized and excluded from the data that is analyzed. The moisture signal rises linearly from the clean windshield level with a characteristic time of from 20 seconds to several minutes. It has an amplitude that is many times larger than the largest rain signal so that it will not be confused with the buildup of rain on the windshield. Also, when the wipers are wiping, the moisture signal will not change when the wipers pass. Mostly, when there is condensing moisture on the glass, it is raining so there are a variety of conditions that must be satisfied for the microprocessor to have detected an interior fog condition. The confirming signature is that when fog is detected condensing on the windshield which causes the air conditioner to turn on, the signal (lock-in amplifier output signal) should decrease rapidly (the time scale is short compared to the time required for the fog to buildup) to the clean window level. In terms of the output signal going to the air conditioner, it could be either a binary signal when a predetermined level of fog is detected, or it could be a calibrated signal which is proportional to the amount of fog on the windshield and would be used to turn the dehumidifier on and off.

The smoke detecting process is similar to that described above. After the wiper passage is removed from the signal (the output signal from the lock-in amplifier), a large rapid variation with a time scale of from 250 ms to 5 seconds is the first condition that must be satisfied by a smoke signal. These times are clearly distinct from the passage of the wipers and from variation due to fog. In addition, these signals are many times larger than any rain signal or splash, and constitute the second condition that must be satisfied. Also, the time for the smoke signal to increase is always less than the time for it to decrease, the third condition. It is more difficult to make a signal output proportional to the amount of smoke. It would be preferable to have a binary output that is used to control the admission of outside air into the passenger compartment.

Figure 6:
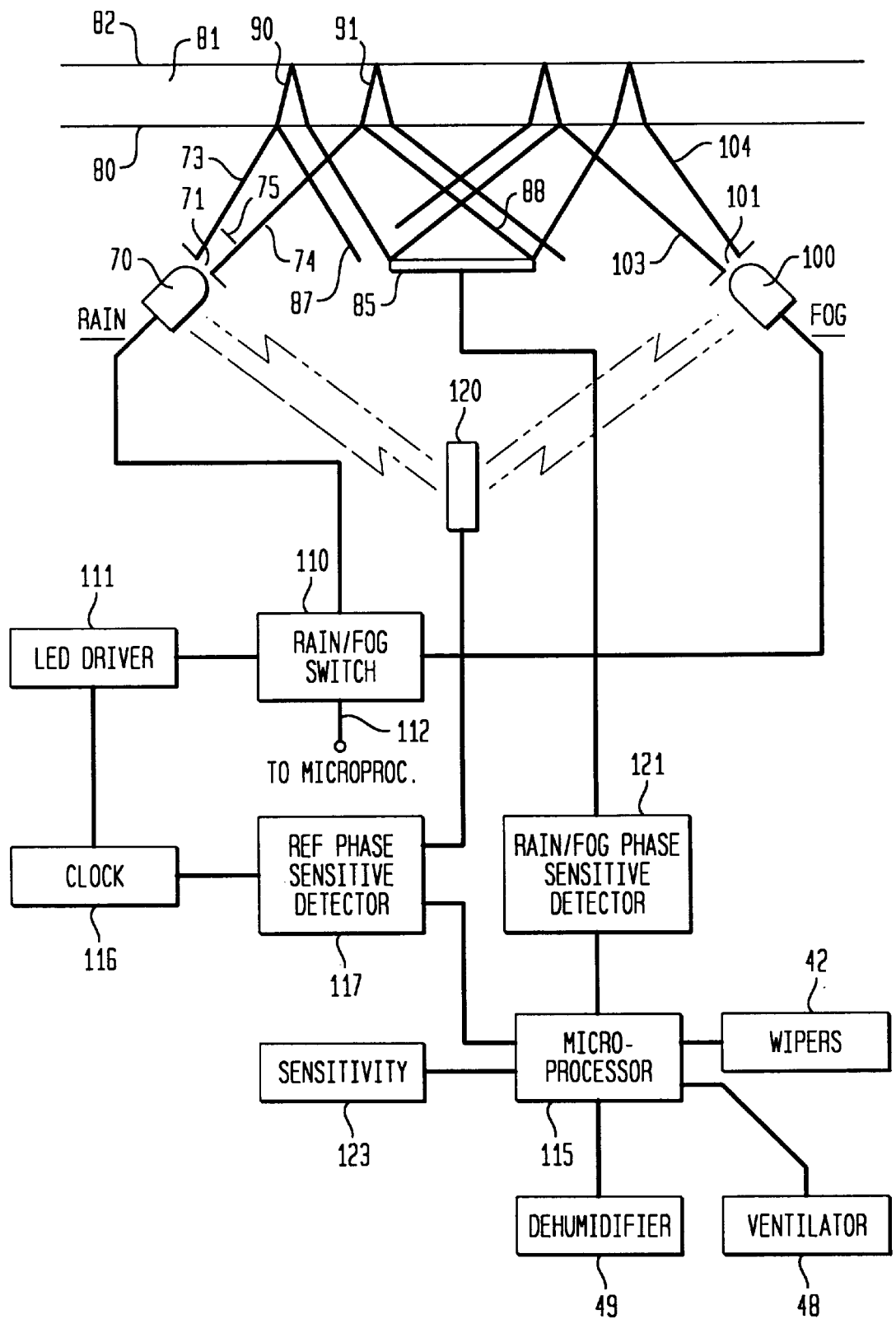
FIG. 6 is a schematic representation of circuitry that drives first and second light emitting diodes alternatingly to achieve rain and fog identification, and a reference system for overcoming the effects of age and temperature on the light emitting diodes.

FIG. 6 is a schematic representation of circuitry that drives first and second light emitting diodes alternatingly to achieve rain and fog identification, and a reference system for overcoming the effects of age and temperature on the light emitting diodes. As shown in this figure, a light source 70 is arranged behind an aperture 71 whereby rays 73 and 74 of radiant energy are issued from the light source and propagate through aperture 71. There is provided in the light path a mask 75 which is disposed in a path along which the radiant energy from light source 70 would propagate to reflect from a first surface 80 of a translucent material 81 to impinge upon a first sensor 85. Mask 75 therefore functions to exclude radiant energy that would impinge directly upon first sensor 85 as a result of direct reflection from surface 80. Such reflecting rays are designated as rays 87 and 88, and are shown to avoid illumination on the first sensor.

Also as shown in FIG. 6, a further portion of ray 73 is refracted into translucent material 81, as refracted ray 90. Refracted ray 90 is shown to be reflected off of second surface 82 of the translucent material and ultimately exists through first surface 80 and avoids direct impingement upon first sensor 85. Similarly, a portion of ray 74 is refracted into the translucent material as refracted ray 91 and it too is shown to exit the first surface of the translucent material and avoid impingement on the first sensor. Thus, light source 70, aperture 71, and mask 75 cooperate to prevent the radiant energy emitted from light source 70 from impinging on the first sensor, irrespective of whether the radiant energy is reflected from first surface 80 or reflected after refraction from second surface 82 of the translucent material.

Further in regard of FIG. 6, there is provided a second light source 100 that is arranged behind an aperture 101 and emits radiant energy in the form of rays 103 and 104, which comprise the extreme outward rays of the bundle (not shown) of emitted radiant energy. The radiant energy emitted by light source 100 is rather collimated in this embodiment and, as shown, will reflect directly onto first sensor 85. In this embodiment, the impingement of the radiant energy issued by light source 100 onto first sensor 85 will occur irrespective of whether the radiant energy is reflected from first surface 80 of translucent material 81, or refracted and reflected from second surface 82.

For convenience, the structure associated with light source 70 will be designated as the "rain" system and the structure associated with light source 100 will be designated as the "fog" system. Referring now to the rain system, radiant energy from light source 70, as previously described, will not reflect directly onto first sensor 85. However, in the event of rain being present in the form of water droplets on outer surface 82 of translucent material 81, internal reflections within the water droplet, in the manner described hereinabove with respect to FIG. 1, will cause some of the radiant energy to be displaced collaterally whereby it will illuminate first sensor 85. In essence, therefore, the presence of water droplets on the second surface will cause an increase in the amount of the radiant energy issued by light source 70 that will impinge upon first sensor 85.

A different modality is embodied in the fog system. As previously stated, the radiant energy issued by light source 100 is rather collimated whereby, in combination with aperture 101, almost all of the radiant energy it produces would reflect from first surface 80 of the translucent material onto first sensor 85. Moreover, much of the refracted energy that is reflected from the second surface of the translucent material also will impinge upon first sensor 85. Thus, only a relatively small amount of the radiant energy that passes through aperture 101 fails to reflect on the first sensor. In operation, the presence of water droplets on first surface 80 of the translucent material will cause at least a portion of the radiant energy being issued from light source 100 to be scattered, resulting in a decrease in the radiant energy impinging upon first sensor 85.

Light sensors 70 and 100 are alternatingly illuminated in response to a rain/fog switch 110 that switches the LED drive energy from driver 111 in response to a signal received at an input 112 from a microprocessor 115. In this embodiment, LED driver 111 is coupled to a clock 116 that is additionally coupled to a reference phase/sensitive detector 117, the operation of which will be described hereinbelow.

In addition to the radiant energy that is emitted through their respectively associated apertures, light sources 70 and 100 are arranged to emit a portion of their energy toward a second sensor 120. Second sensor 120 operates as a reference channel that monitors the radiant energy output of sources 70 and 100. The radiant energy output of the sources will change as a result of temperature and aging. In some embodiments of the intervention, the second sensor need only monitor one of the light sources, as such monitoring will provide a good indication of a change in the output of the other source, since both sources share similar environments, have similar temperatures applied thereto, and have similar ages. Second sensor 120 is insensitive to ambient light and responds only to the radiant energy received from the sources themselves. The electrical output of second sensor 120 is used, in this embodiment, to normalize variations in the rain and fog signals resulting from such aging and heating.

In this embodiment, the radiant energy emitted by the light sources is modulated essentially by a square wave and therefore the characteristics of the output radiant energy received at second sensor 120 is measured in this embodiment using separate detection circuitry. Thus, second sensor 120 is coupled at its output to a reference phase sensitive detector 117, which in some embodiments of the invention may be replaced with a differential sample-and-hold circuit. The reference phase sensitive detector, except for some minor variations which are within the scope of the abilities of a person of ordinary skill in the art, is structurally identical to rain/fog phase sensitive detector 121, described hereinabove with respect to FIG. 4. Thus, microprocessor 115 receives the output signals generated by reference phase sensitive detector 117, rain/fog phase sensitive detector 121, and a sensitivity signal 123, the generation and function of which is described hereinabove with respect to FIG. 2. Microprocessor 115, therefore is enabled to control the operation of wipers 42, ventilator 48, dehumidifier 49, as well as power windows (not shown), a sunroof (not shown), and a convertible top (not shown), discussed hereinabove with respect to FIG. 3.

The ratio of the rain signal to the radiant energy output of the sources is a constant independent of the actual radiant output of the sources and is only a measure of the amount of water on the translucent material, because the received rain signal is proportional to the radiant energy output of the sources. By dividing the rain signal by a signal proportional to the radiant output, the ratio may be seen to be independent of the source output and only a measure of the amount of water on the translucent material. Also, for the same reasons, the ratio of the fog signal to the radiant output of source 100 is independent of the radiant output in a measure of fog, and to some extent, rain. Microprocessor 115 computes these ratios.

Further in regard of the fog channel, source 100 causes, as described, a radiant energy to be reflected from the first surface of the translucent material to measure fog, refracted/reflected radiant energy from the second surface to measure rain. A radiant energy is received by first sensor 85 which is the same sensor that detects radiant energy from the rain system. By alternately illuminating the rain source (70) and the fog source (100), the state of the fog on the first surface of the translucent material can be determined. Switching times of 0.1 second or faster are preferable so that the rain and fog signals are measured almost simultaneously. Microprocessor 115 controls which of the sensors is illuminated at any given time so that the rain and fog signals can be distinguished from one another.

The fog system is very sensitive to fog (condensation) on the first surface of the translucent material and less sensitive to rain on the second surface of the translucent material because the proximal fog scatters the radiant energy onto first sensor 85 before the energy enters the translucent material. This is the case because more radiant energy is reflected from the first surface than the distal second surface. Radiant energy that enters the translucent material and is reflected from the second surface must traverse the translucent material twice. In a preferred embodiment of the intervention, sources 70 and 100 are infrared LEDs so that their output light will not distract the operator of a vehicle (not shown). However, the windshields of modern vehicles are made from solar glass that absorbs infrared radiation to minimize the heat load on the air conditioning system. Consequently, infrared LED light which has to make two passes through the windshield and is reflected from the outer surface may have 1/10 the intensity of light that is reflected from the interior surface. Thus, although the fog system is mostly sensitive to fog, it is also sensitive to rain. The ratio of fog-to-rain sensitivity can be changed to an extent by shifting the energy that lands on first sensor 85 using the apertures to favor, for example, light that is reflected from the exterior of the windshield (translucent material). It can be seen from FIG. 6 that radiant energy that is reflected from the distal second surface is shifted further from fog source 100.

Small amounts of condensation on the first surface of a translucent material will generate signals in the fog system as well as the rain system before such condensation is visible to the vehicle operator. The presence of a droplet on the first surface scatters light from fog source 100, and therefore the amount of radiant energy that reaches first sensor 85 is diminished. On the other hand, fog scatters more light from rain source 70 onto first sensor 85 when the overall arrangement is in the rain mode, i.e., source 70 is illuminated, and source 100 is dark. Thus, the combination of a decrease in the fog signal and an increase in the rain signal indicates fog if these changes have ratios within a calibrated range. The microprocessor (115) will initiate action to dehumidify the translucent material.

It is to be understood that the fog system is not limited to indicate fog, but can be used to monitor the presence of rain on the second surface of translucent material. Rain droplets reduce the amount of light reflected back to the first sensor. In operation during a wipe, the highest signal in the fog channel is received shortly after it passes by because the wiper removes the drops that scatter the signal out of the fog beam. Then, as rain begins to accumulate on the windshield, the amplitude of the fog signal decreases. In the rain channel, the opposite occurs. After the wiper passes, the rain signal is at its lowest and increases as drops accumulate on the windshield. The presence of fog does not significantly affect this sequence if it is not changing too rapidly, because it is taken into account when the wiper (not shown) goes by. However, if the fog level on first surface 80 of the translucent material is changing rapidly, it could trigger a wipe. If there is no change in the rain and fog signals from immediately before to immediately after the wipe, microprocessor 115 will recognize that fog is present, and will raise the level of signal that will be necessary to trigger the next wipe.

Figure 7:
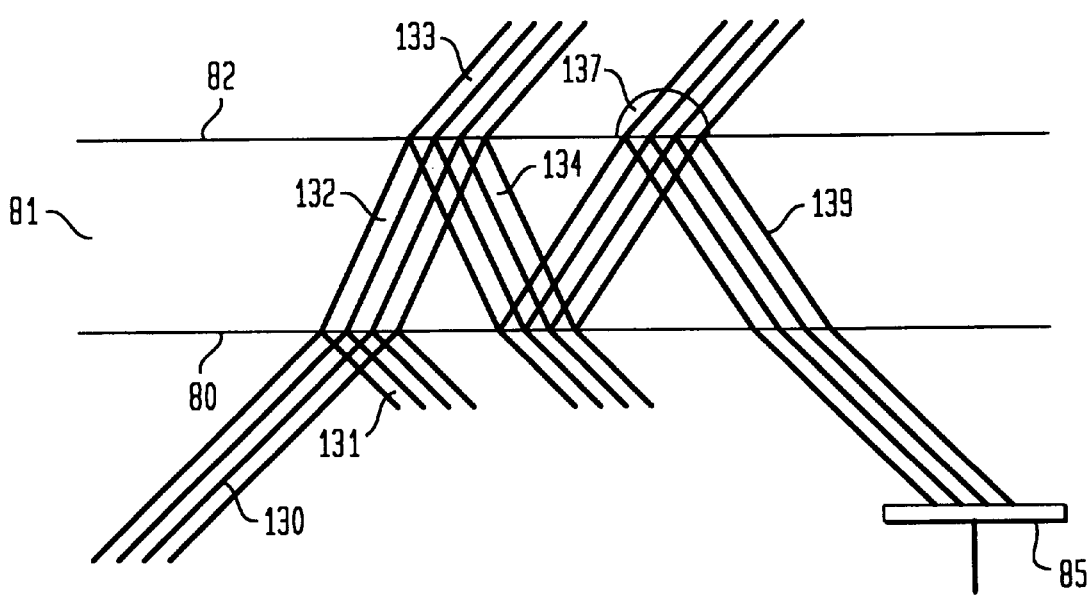
FIG. 7 is a schematic representation of an arrangement where light is reflected internally in the translucent material before it exits to impinge upon a light sensor.

FIG. 7 is a schematic representation of an arrangement where light is reflected internally in the translucent material before it exits to impinge upon a light sensor. As shown in this figure, a beam of radiant energy 130 is directed at first surface 80 of translucent material 81, a portion 131 being reflected from the first surface, and a further portion 132 being refracted into the translucent material. A portion 133 of beam 132 is refracted out of the translucent material through second surface 82, while a further portion 134 is reflected back toward first surface 80. This process continues until a water droplet 137 is encountered on second surface 82 whereby some scattering of the energy is achieved and the scattered energy, in the form of beam 139 ultimately exits the translucent material and impinges upon sensor 85.

As can be seen from the foregoing, some of the light reflects in the translucent material after it undergoes many reflections. After each such reflection, its intensity is approximately 4% of the intensity that it had before it was reflected. The presence of a water droplet on second surface 82, which may be considered the outside of a windshield, will cause some of light that would have been reflected to pass out of the windshield whereby it no longer impinges upon sensor 85. Thus, the amount of radiant energy that impinges upon the sensor is reduced. Similarly, if a water droplet is not present in accordance with FIG. 7, but instead is present at the point of intersection of beams 132, 133, and 134 on second surface 82, then the radiant energy again would be scattered in many directions, whereby again, less light would impinge upon sensor 85. Such diminution in the amount of the light that impinges upon sensor 85 is effected when the droplet of water is present at one or more of the points where the light is reflected at surface 82.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for detecting the presence of water droplets on a windshield of a vehicle, the windshield having interior and exterior surfaces so as to have interior and exterior sides, the arrangement comprising:

an energy source disposed on the interior side of the windshield, for producing a radiant energy, a first portion of the radiant energy being directed toward the interior surface of the windshield and a second portion, corresponding to a portion of the first portion, being reflected in a direction away from the windshield, said energy source having a time varying characteristic whereby a predetermined characteristic of the radiant energy varies over time;

a first sensor disposed on the interior side of the windshield and having a first sensor input for receiving the second portion of the radiant energy; said first sensor further having a sensor output for producing a first sensor output electrical signal responsive to the radiant energy received at the first sensor input;

a second sensor disposed on the interior side of the windshield and having a second sensor input for receiving a third portion of the radiant energy produced by said energy source, said second sensor having a sensor output for producing a second sensor output electrical signal responsive to the third portion of the radiant energy received at the second sensor input; and a processor for receiving information responsive to the first and second sensor output electrical signals, and an output for producing a control signal, the control signal being responsive to a first information component in said first sensor output electrical signal responsive to the presence of water droplets on the exterior surface of the windshield, a second information component in said first sensor output electrical signal responsive to the time-varying characteristic of said energy source, and a third information component derived from said second sensor output electrical signal.

2. The arrangement of claim 1, wherein the third portion of the radiant energy produced by said energy source has a magnitude that is in fixed relationship to the radiant energy produced by said energy source.

3. The arrangement of claim 2 wherein the time-varying characteristic of said radiant energy is responsive to a variation in a characteristic of said energy source with age.

4. The arrangement of claim 3 wherein the time-varying characteristic of said radiant energy corresponds to a variation in the intensity of the radiant energy as said energy source ages.

5. The arrangement of claim 1 wherein the time-varying characteristic of said radiant energy is responsive to a variation in a characteristic of said energy source with temperature.

6. The arrangement of claim 5 wherein the time-varying characteristic of said energy source corresponds to a variation in the intensity of the radiant energy as said energy source becomes heated over time.

7. The arrangement of claim 1 wherein there is further provided sensitivity control input coupled to said processor for receiving a sensitivity signal for predetermining a quantum of water droplets characteristic of the control signal.

8. The arrangement of claim 1 wherein the vehicle is provided with a windshield wiper, and there is further provided windshield wiper controller for operating a windshield wiper in response to the control signal.

9. The arrangement of claim 8 wherein there is further provided windshield wiper timer for producing a signal responsive to the duration of a wipe cycle of the windshield wiper.

10. The arrangement of claim 1 wherein the vehicle is provided with a window, and there is further provided window controller for operating the window in response to the control signal.

11. The arrangement of claim 1 wherein the vehicle is provided with an openable top, and there is further provided openable top controller for operating the openable top in response to said control signal.

12. The arrangement of claim 1 wherein the vehicle is provided with a convertible top, and there is further provided a convertible top controller for operating the convertible top in response to the control signal.

13. An arrangement for producing a control signal in response to the presence of liquid droplets on a translucent material having first and second surfaces on respective first and second sides of the translucent material, the arrangement comprising:

first energy source disposed on the first side of the translucent material for producing a first radiant energy and directing same toward at least a portion of the first surface of the translucent material, a first portion of the first radiant energy being reflected by the translucent material, and a second portion of the first radiant energy being scattered by the water droplets on the translucent material;

second energy source disposed on the first side of the translucent material for producing a second radiant energy and directing same toward at least a portion of the first surface of the translucent material, a first portion of the second radiant energy being reflected by the translucent material, and a second portion of the second radiant energy being scattered by the water droplets on the translucent material;

a cyclical driver coupled to said first and second energy sources for causing said first energy source to produce the first radiant energy during a first portion of a cycle and for causing said second energy source to produce the second radiant energy during a second portion of a cycle; and a first sensor having a first sensor input for receiving an ambient light, a received portion of the second portion of the first radiant energy from said first energy source, the first portion of the first radiant energy being excluded from said first sensor and the second portion of the radiant energy having an amplitude that is responsive to the water droplets on the translucent material, and received portions of the first and second portions of the second radiant energy, said first sensor further having a first sensor output for producing a first sensor output electrical signal responsive to light received at the first sensor input.

14. The arrangement of claim 13, wherein there is further provided a second sensor having a second sensor input for receiving a third portion of the first radiant energy produced by said first energy source, said second sensor having a sensor output for producing a second sensor output electrical signal responsive to the third portion of the first radiant energy received at the second sensor input.

15. The arrangement of claim 14, wherein said second sensor additionally receives at the second sensor input a third portion of the second radiant energy produced by said second energy source.

16. The arrangement of claim 15, wherein the ambient light is excluded from the second sensor input.

17. The arrangement of claim 14, wherein there is further provided a phase-sensitive detector coupled at an input thereof to the second sensor output.

18. The arrangement of claim 14, wherein there is further provided a differential sample-and-hold arrangement coupled at an input thereof to the second sensor output.

19. The arrangement of claim 13 wherein there is further provided a phase-sensitive detector coupled at an input thereof to the first sensor output.

20. The arrangement of claim 13 wherein there is further provided an input coupled to said controller for receiving a sensitivity signal that adjusts the sensitivity of the arrangement in correspondence with the number of water droplets on the first surface of the translucent material.

21. A method of producing a signal responsive to droplets of a liquid on a surface of a translucent material, the translucent material having first and second surfaces on first and second sides thereof, the method comprising the steps of:

first illuminating the first surface of the translucent material from the first side thereof with a first cyclically varying light which is in an illuminated state for a first portion of a cycle and dark for a second portion of the cycle, the first cyclically varying light having a first portion directed along a first reflection path to a light sensor, and a second portion that is not directed along the first reflection path;

second illuminating the first surface of the translucent material from the first side thereof with a second cyclically varying light which is in an illuminated state for the second portion of the cycle and dark for the first portion of the cycle, the second cyclically varying light having a first portion directed along a second reflection path to a light sensor, and a second portion that is not directed along the second reflection path;

first excluding from impinging on a light sensor the first portion of the first cyclically varying light;

receiving at the light sensor a portion of the second portion of the first cyclically varying light that is scattered by the droplets of the liquid on the translucent material;

receiving at the light sensor an ambient light;

receiving at the light sensor a reflected portion of the first portion of the second cyclically varying light; and producing at an electrical output of the light sensor a sensor signal corresponding to the light received by the light sensor.

22. The method of claim 21, wherein there is further provided the step of second excluding from impinging on the light sensor the second portion of the second cyclically varying light.

23. A method of producing a signal responsive to droplets of a liquid on a surface of a translucent material, the translucent material having first and second surfaces on first and second sides thereof, the method comprising the steps of:

first illuminating the first surface of the translucent material from the first side thereof with a first cyclically varying light which is in an illuminated state for a first portion of a cycle and dark for a second portion of the cycle, the first cyclically varying light having first and second light portions, the first light portion being directed along a first reflection path configured to avoid impinging upon a first light sensor;

receiving at the first light sensor a portion of the second light portion of the first cyclically varying light that is scattered by the droplets of the liquid on the translucent material;

receiving at the first light sensor an ambient light;

producing at an electrical output of the first light sensor a first sensor signal corresponding to the light received by the first light sensor;

receiving at a second light sensor a further portion of the second light portion of the first cyclically varying light;

producing at an electrical output of the second light sensor a second sensor signal corresponding to the light received by the second light sensor; and correcting a first information content in the first sensor signal with a second information content in the second sensor signal.

24. The method of claim 23, wherein there is provided the further step of second illuminating the first surface of the translucent material with a second cyclically varying light which is in an illuminated state for the second portion of a cycle and dark for the first portion of the cycle, a first light portion of the second cyclically varying light being directed along a second reflection path configured to impinge upon the first light sensor.

25. The method of claim 24, wherein there are further provided the steps of:

receiving at the first light sensor a reflected portion of the first portion of the second cyclically varying light; and receiving at the second light sensor a portion of the second cyclically varying light.

26. The method of claim 25, wherein there is provided the step of further receiving at the first light sensor a portion of the first portion of the second cyclically varying light that has been multiply reflected within the translucent material.

27. The method of claim 23, wherein there is further provided the step of controlling the operation of a selectable one of a wiper system and a blower system in response to the first sensor signal.

28. A method of producing a plurality of signals, each responsive to a predetermined environmental condition of a vehicle of the type having a windshield having interior and exterior surfaces on respective interior and exterior sides thereof, the method comprising the steps of:

energizing a first source of illumination whereby a first electromagnetic energy is directed from the interior side of the windshield toward the interior surface of the windshield, the first electromagnetic energy being in the form of a cyclically varying light that is emitted while the first source of illumination is in an illuminated state for a first portion of a cycle, the first electromagnetic energy not being emitted while the source of illumination is dark during a second portion of the cycle;

energizing a second source of illumination whereby a second electromagnetic energy is directed from the interior side of the windshield toward the interior surface of the windshield, the second electromagnetic energy being in the form of a cyclically varying light that is emitted while the second source of illumination is in an illuminated state for the second portion of a cycle, the second electromagnetic energy not being emitted while the source of illumination is dark during the first portion of the cycle;

receiving at a light sensor an ambient light, a portion of the first cyclically varying light that has been scattered in response to the environmental condition at the interior surface or exterior surface of the windshield, a portion of the second cyclically varying light that has been reflected by the windshield, and a portion of the second cyclically varying light that has been scattered in response to the environmental condition at the interior surface or exterior surface of the windshield;

producing at an electrical output of the light sensor a sensor signal corresponding to the light received by the light sensor; and producing a control signal.

29. The method of claim 28 wherein the environmental condition is water droplets being deposited on the exterior of the windshield, and the first and second cyclically varying lights in said step of receiving are scattered by the water droplets.

30. The method of claim 28 wherein the environmental condition is water vapor condensing on the interior of the windshield, and the first and second cyclically varying lights in said step of receiving are scattered by the condensed water vapor.

31. The method of claim 28 wherein the environmental condition is the presence of smoke particles in the vehicle and interposed in a light path between the first source of illumination and the light sensor, and the cyclically varying light in said step of receiving is scattered by the smoke particles.

32. The method of claim 28, wherein there are further provided the steps of:
- receiving at a further light sensor respective portions of the first and second sources of illumination; and
- producing a compensation signal at the output of the further light sensor.

\* \* \* \* \*